United States Patent
Meschkat et al.

(10) Patent No.: US 9,998,415 B1
(45) Date of Patent: Jun. 12, 2018

(54) IMMEDIATE COMMUNICATION MODE FOR EMAIL CONVERSATIONS

(71) Applicant: GOOGLE INC., Mountain View, CA (US)

(72) Inventors: Steffen Meschkat, Zurich (CH); Garrick Toubassi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 880 days.

(21) Appl. No.: 14/341,574

(22) Filed: Jul. 25, 2014

(51) Int. Cl.
 *H04L 12/58* (2006.01)
 *G06F 3/0482* (2013.01)
 *G06F 3/0481* (2013.01)

(52) U.S. Cl.
 CPC ............ *H04L 51/22* (2013.01); *G06F 3/0482* (2013.01); *G06F 3/04817* (2013.01); *H04L 51/04* (2013.01); *H04L 51/12* (2013.01)

(58) Field of Classification Search
 None
 See application file for complete search history.

(56) References Cited

U.S. PATENT DOCUMENTS

| | | | | |
|---|---|---|---|---|
| 7,149,507 B2* | 12/2006 | Koshihara | ............ | H04L 12/5875 379/67.1 |
| 7,490,299 B2* | 2/2009 | Karstens | ................ | G06F 3/0481 710/48 |
| 8,020,105 B1* | 9/2011 | Lemay | ............... | H04M 1/72552 709/227 |
| 8,438,234 B2* | 5/2013 | Kunz | ................... | G06Q 10/107 455/412.1 |
| 2005/0055412 A1* | 3/2005 | Kaminsky | ............. | H04L 12/581 709/207 |
| 2005/0132012 A1 | 6/2005 | Muller et al. | | |
| 2005/0223062 A1* | 10/2005 | Doan | ...................... | H04L 51/14 709/206 |
| 2007/0116195 A1 | 5/2007 | Thompson et al. | | |
| 2007/0185961 A1 | 8/2007 | Perlow et al. | | |
| 2007/0245249 A1 | 10/2007 | Weisberg | | |
| 2008/0037721 A1 | 2/2008 | Yao et al. | | |
| 2008/0147804 A1* | 6/2008 | Gyure | ..................... | H04L 51/18 709/206 |
| 2008/0208984 A1 | 8/2008 | Rosenberg et al. | | |
| 2009/0044252 A1 | 2/2009 | Kashima et al. | | |
| 2009/0172116 A1 | 7/2009 | Zimmet et al. | | |
| 2009/0319623 A1 | 12/2009 | Srinivasan et al. | | |

(Continued)

*Primary Examiner* — Christopher J Fibbi
(74) *Attorney, Agent, or Firm* — Shumaker & Sieffert, P.A.

(57) ABSTRACT

Provided are methods and systems for providing a user with the ability to select how new or on-going e-mail messages are displayed to the user, as well as how the e-mail messages are displayed to other users participating in the e-mail conversation. The methods and systems provide a modification of the behavior of a user interface widget for composing an e-mail message (both starting a new conversation and responding to an existing conversation), and also a modification of the way in which an inbox of an online mail application notifies a user of a newly arrived/received message. An e-mail conversation can be made to behave like a chat conversation, but with each participant in a multi-participant conversation having the ability to select whether to see (e.g., view) the conversation in e-mail format or chat format, and also having the ability to change this selection while the conversation is ongoing.

19 Claims, 12 Drawing Sheets

(56) References Cited

U.S. PATENT DOCUMENTS

| | | | |
|---|---|---|---|
| 2009/0319918 A1* | 12/2009 | Affronti | G06F 3/038 |
| | | | 715/753 |
| 2010/0217809 A1 | 8/2010 | Vymenets et al. | |
| 2010/0312836 A1 | 12/2010 | Serr et al. | |
| 2011/0202611 A1* | 8/2011 | Malik | H04L 51/04 |
| | | | 709/206 |
| 2012/0191787 A1 | 7/2012 | Huang et al. | |
| 2012/0233270 A1 | 9/2012 | Lee et al. | |
| 2013/0086175 A1 | 4/2013 | Claux et al. | |
| 2014/0215352 A1* | 7/2014 | Blecon | H04L 12/1827 |
| | | | 715/752 |

\* cited by examiner

IMMEDIATE COMMUNICATION MODE FOR EMAIL CONVERSATIONS

BACKGROUND

In existing online mail applications, there are usually two modes of conversation available: e-mail and chat. In at least one existing online mail application, ongoing e-mail conversations are listed in the inbox while ongoing chat conversations are kept in small windows in the foreground. One of the main differences between the two modes of conversation is that of focus. In order to respond to an e-mail conversation, a user places the conversation into focus (e.g., the user opens the e-mail), writes a reply e-mail, and sends the reply e-mail. When the reply e-mail is sent, the conversation is again gone from the user's focus (e.g., the conversation reduces to the list in the user's inbox). Once a response from another participant is made to the same e-mail conversation, the conversation is bumped to the top of the user's inbox, but does not get focused into the foreground of the user's attention.

One of the main differences between these two modes of communication is the permanence of their presence in the user's focus. However, the need to focus on a specific conversation changes over the lifetime of the conversation.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for online communications. More specifically, aspects of the present disclosure relate to providing users with the ability to select how an online communication behaves in terms of the communication being displayed to the user and the communication being accessible to the user.

One embodiment of the present disclosure relates to a computer-implemented method comprising: receiving an incoming message, the incoming message including an active focus indicator; determining that the active focus indicator is turned on for the received message; bringing a compose message widget into active focus in a foreground of a window; and displaying the received message in the compose message widget, wherein the displayed message includes an indication that the active focus indicator is turned on for the message.

In another embodiment, the computer-implemented method further comprises redirecting a cursor to the compose message widget.

In another embodiment, the computer-implemented method further comprises determining that the active focus indicator is turned off for the received message, and closing the compose message widget.

In yet another embodiment, the computer-implemented method further comprises determining that the active focus indicator is blocked from being turned on for the received message, and generating a notification of the received message in a message inbox.

In still another embodiment, the incoming message includes an active focus indicator specific to each of the intended recipients of the message, and the computer-implemented method further comprises: determining, for each of the intended recipients of the message, whether the active focus indicator specific to the recipient is turned on or turned off; in response to determining that the active focus indicator is turned on for the recipient, bringing a compose message widget into active focus in a foreground of a window being displayed to the recipient, and displaying the message in the compose message widget, wherein the displayed message includes an indication that the active focus indicator is turned on for the recipient; and in response to determining that the active focus indicator is turned off for the recipient, closing the compose message widget.

Another embodiment of the present disclosure relates to a system of one or more processors and a non-transitory computer-readable medium coupled to the one or more processors having instructions stored thereon that, when executed by the one or more processors, cause the one or more processors to perform operations comprising: receiving an incoming message, the incoming message including an active focus indicator; determining that the active focus indicator is turned on for the received message; bringing a compose message widget into active focus in a foreground of a window; and displaying the received message in the compose message widget, wherein the displayed message includes an indication that active focus indicator is turned on for the message.

In another embodiment, the one or more processors of the system are caused to perform further operations comprising redirecting a cursor to the compose message widget.

In another embodiment, the one or more processors of the system are caused to perform further operations comprising determining that the active focus indicator is turned off for the received message, and closing the compose message widget.

In yet another embodiment, the one or more processors of the system are caused to perform further operations comprising determining that the active focus indicator is blocked from being turned on for the received message, and generating a notification of the received message in a message inbox.

In yet another embodiment, the incoming message includes an active focus indicator specific to each of the intended recipients of the message, and the one or more processors of the system are caused to perform further operations comprising: determining, for each of the intended recipients of the message, whether the active focus indicator specific to the recipient is turned on or turned off; in response to determining that the active focus indicator is turned on for the recipient, bringing a compose message widget into active focus in a foreground of a window being displayed to the recipient, and displaying the message in the compose message widget, wherein the displayed message includes an indication that the active focus indicator is turned on for the recipient; and in response to determining that the active focus indicator is turned off for the recipient, closing the compose message widget.

Yet another embodiment of the present disclosure relates to a computer-implemented method comprising: receiving a message in a compose message widget, wherein an active focus indicator is turned on for the message; sending the composed message with the active focus indicator to at least one recipient; and maintaining the compose message widget in an active focus in the foreground of a window.

In still another embodiment, the active focus indicator is turned off for the message received in the compose message widget, and the computer-implemented method further comprises sending the composed message with the active focus indicator to at least one recipient, and closing the compose message widget.

In still another embodiment, the computer-implemented method further comprises displaying the sent message in the compose message widget, wherein the displayed message includes an indication that the active focus indicator is turned on for the message.

In still another embodiment, an active focus indicator associated with a first intended recipient of the message received in the compose message widget is turned on and an active focus indicator associated with a second intended recipient of the message received in the compose message widget is turned off, the first intended recipient being different than the second intended recipient, and the computer-implemented method further comprises sending the composed message with the respective active focus indicators to the first and second intended recipients.

In still another embodiment, the computer-implemented method further comprises displaying the sent message in the compose message widget, wherein the displayed message includes an indication that the active focus indicator associated with the first intended recipient is turned on.

In one or more other embodiments, the methods and systems described herein may optionally include one or more of the following additional features: the message displayed in the compose message widget includes an indication that the active focus indicator is turned on for a first recipient of the message and is turned off for a second recipient of the message; the determination that the active focus indicator is turned on for the received message is based on one or more keywords in the text of the received message; the displayed message includes an indication that the active focus indicator associated with the second intended recipient is turned off; and/or the incoming message includes an active focus indicator specific to each of the intended recipients of the message.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
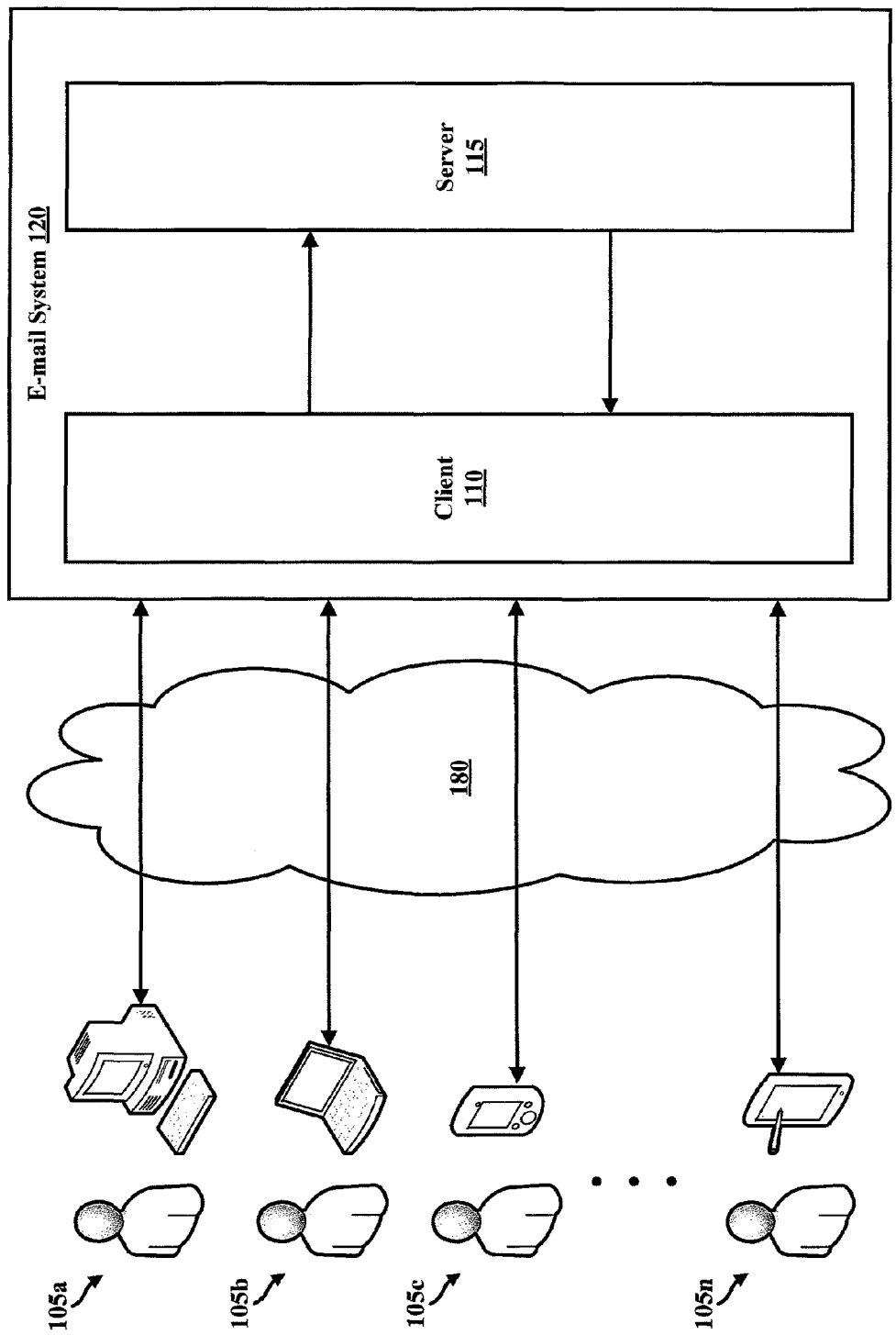
FIG. 1 is a block diagram illustrating an example system for selecting and/or changing a display state of an e-mail conversation according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Two of the most widely used online communication systems these days are e-mail and chat. With e-mail, a first user composes a message and sends the message to a second user (or to multiple users, each of which may be referred to as a "recipient" or collectively as "recipients"). The second user receives the message in his or her e-mail inbox and has an opportunity to respond to the message. If the second user sends a response to the first user's message, then both the first user's initial message and the second user's response message will appear together as an e-mail "thread" (sometimes referred to herein as an e-mail "conversation") in each of the user's e-mail inboxes.

As discussed above, one of the main differences between e-mail and chat communications is the permanence of the on-going conversation's presence in the user's focus. Other attributes in which these modes of communication may differ (e.g., the application protocol used to transmit messages in the conversation to and from the participants) are largely incidental. However, the need to focus on a specific conversation changes over the lifetime of the conversation. For example, something that starts as an e-mail conversation might accelerate such that the user wishes to remain focused on the conversation and receive any further responses to the conversation (e.g., from other participants to the conversation) right in the foreground of the user's view. Conversely, a user may agree to something over a chat communication and follow-up with an e-mail confirmation regarding the same. However, it may be the case that the user sends the follow-up e-mail confirmation simply to make the agreement of record, and it is not necessary for the e-mail confirmation to get into the recipient's attention right away.

In the example scenario of a group conversation, the immediacy of participation desired by different participants might not be the same from one participant to the next. For example, principal protagonists of the conversation may wish to focus on the conversation even while other participants may just want to follow along eventually.

In any of the example scenarios described above, it would be useful if the decision as to where a conversation appears in the focus of each participant (e.g., with respect to an e-mail application view being displayed to the participant) could be chosen by each participant rather than being predetermined according to the type (e.g., mode or kind) of conversation (e.g., e-mail or chat). Accordingly, embodiments of the present disclosure relate to methods and systems for providing users with the ability to select how a communication (e.g., an e-mail conversation) behaves in terms of the communication being displayed to the user and the communication being accessible to the user.

In at least one existing approach, an e-mail communication may be "flagged" or "labeled" by a user to indicate importance of the communication. However, this type of indication is only for the user who applies it, and the indication is not transmitted to any other users (e.g., participants) associated with the communication.

As will be described in greater detail herein, the methods and systems of the present disclosure provide a modification of the behavior of a user interface widget for composing an e-mail message (both starting a new conversation or responding to an existing conversation), and also a modification of the way in which an inbox of an online mail application notifies a user of a newly arrived/received message. For example, in accordance with at least one embodiment, an e-mail conversation (e.g., an exchange of e-mail messages between at least two users, where the e-mail messages are part of the same e-mail "thread") can be made to behave like a chat conversation, but with each participant having the ability to select whether to see (e.g., view) the conversation in an e-mail format or in a chat format, and also having the ability to change this selection while the conversation is ongoing. Among the numerous advantages of the methods and systems described herein, is reducing the fragmentation of the communication product/service range in that e-mail and chat become options in a single product/service rather than two separate and disjoint products/services.

In accordance with at least one embodiment, a "compose message widget" (e.g., a window that may open and overlay a current view (e.g., the inbox) in an e-mail application to enable a user to compose an e-mail message, whether a new message or a reply message to an existing communication) exposes a user-selectable control to "pin" the conversation for the user, as well as for each recipient of the composed message. The control (which may sometimes be referred to herein as "pin control", "pin button", "active focus indicator", or the like) may be, for example, a selectable push button or equivalent, such that the control may be toggled between an inactive state and an active state. In accordance with at least one embodiment, if a composed message is "pinned" by the user that composes the message (e.g., the active focus indicator is in turned "on" or is in the active state), the composed message remains in the active focus of the composing user by continuing to be displayed in the compose message widget, which may remain open and in the foreground view of the composing user after the composed message is sent. In addition, any response to the message received by the user may be displayed directly in the compose message widget such that the message appears in the active focus of the user.

Similarly, when a recipient user receives a message for which the active focus indicator has been turned on (e.g., for the entire message (e.g., all recipients of the message), for just the particular recipient user, for a group of the recipients of the message, etc.), a compose message widget may be opened or brought into active focus in the foreground of a window being viewed by the recipient user, and the received message displayed directly in the compose message widget. In manner described above, the compose widget may be considered to behave like a chat widget.

In accordance with at least one embodiment of the present disclosure, when a recipient user receives a message for which the active focus indicator has been turned on, the received message may be displayed in a compose message widget that is brought into active focus of the recipient user by redirecting a cursor being used by the recipient user to the compose message widget. Redirecting an active cursor to the compose message widget in this manner further emphasizes that the received message is brought into the active focus of the recipient user (e.g., where the recipient user has multiple compose message widgets opened for different ongoing conversations with other users).

Information indicating that a message was "pinned" for a recipient (e.g., data about a state (e.g., active or inactive) of a message display control associated with the message, associated with the intended recipient, or both) may be transmitted along with the content of the message from the sending user to one or more servers associated with the mail application being utilized by the sending user. For recipients that receive their e-mail in the same or similar application or system as the sending user, any of a variety of applicable internal transfer mechanisms may be used. For example, where communications are stored internally within the system in a database, database triggers may be used. Communication between the system server and a proprietary web browser based client may be over JavaSript Object Notation (JSON) messages sent over, for example, the XMLHTTPRequest API. In accordance with at least one embodiment, if a recipient uses a different online mail system or application than the sending user, the information indicating that the message was "pinned" may be stored in, for example, a custom RFC2822 message header field.

Data about a state (e.g., active or inactive) of a message display control associated with a message composed by a sending user, and/or data about a state of a message display control associated with one or more intended recipients of the composed message may be received (e.g., at an e-mail system, such as e-mail system 120 in the example system 100 shown in FIG. 1, which will be described in greater detail below) from any one or more of a variety of user devices of the user (e.g., belonging to, authorized for use by, or otherwise associated with the user), and composed message content may be provided (either together with or separate from such pin control state data) to any one or more of the same or different such user devices for presentation to the user (e.g., for presentation on a display of any such devices). Some non-limiting examples of such user devices include laptop computers, tablet computing devices, mobile telephones, smartphones, wearable user computing devices (e.g., wristwatch or glasses configured as computing devices), as well as numerous other types or variations of such devices similar in nature and/or functionality.

In describing various embodiments and features of the present disclosure, reference is sometimes made to e-mail message data, pin control state data, notifications, etc. "received from a user" and "provided to a user." It should be understood that in the implementation context, data and/or notifications "received from a user" or "provided to a user" means data and/or notifications received from/provided to a device of a user (a "user device"), the device being configured for operation or use by the user. As such, for example, an e-mail message and/or pin control state data "received from a user" may be used interchangeably at times (for purposes of simplicity and brevity) with an e-mail message and/or pin control state data "received from a user device". Similarly, a notification "provided to a user" may be used interchangeably with a notification "provided to a user device".

In accordance with at least one embodiment, for any recipient of a message in which the recipient was "pinned" when the message was composed (e.g., the active focus indicator was turned on or set to active for the recipient in the compose message window of the sender), if the recipient receives the message in an e-mail system that supports the behavior described above, the message may be opened directly in a compose message window displayed to the recipient, ready to be replied to. Furthermore, in accordance with one or more other embodiments, a reply message from a given recipient may be pinned by the recipient as well, just as the original message was pinned by the sender. As such, the display of the received message may behave similar to an incoming chat conversation.

In accordance with one or more embodiments described herein, a "pin state" (or "active focus indicator" state) may apply to or be associated with each participant in an e-mail conversation. For example, a participant may be associated with a pin state corresponding to the state of the participant's pin control (or "active focus indicator") for a particular e-mail message (e.g., based on whether the e-mail message is "pinned" or "unpinned" for the participant), where a participant's pin control may be in different "states" depending on whether the pin control is activated/deactivated/etc. for a message received by the participant, composed by the participant, viewed by the participant, replied to by the participant, and the like. For example, a participant may be associated with a first pin state where the participant receives a message for which the participant's pin control has not been activated or has been deactivated (e.g., by the sender/composer of the message), and may be associated with a second pin state where the participant receives a message for which the participant's pin control has been activated (e.g., by the sender/composer of the message).

In addition, in accordance with at least one embodiment of the present disclosure, a participant may be associated with a third pin state where the participant activates the pin control for a new message composed by the participant (e.g., activates the pin control for the participant and all intended recipients of the message), a fourth pin state where the participant activates the pin control for a reply message composed by the participant, and so on. It should be understood that one or more other pin states may also apply to the participants in an e-mail conversation in addition to or instead of the example pin states described above. It should also be understood that a participant's pin state may be defined or determined based on one or more other indicators in addition to or instead of the state of the pin control for an e-mail message composed/received by the participant. For example, a participant's pin state may be determined based on various keywords (e.g., "pin", "pinned", "focus", "urgent", "ASAP", "immediate", and the like) or special characters (e.g., "!") used within message text in connection with the participant's name.

In accordance with at least one embodiment, the pin state of each participant in an e-mail conversation may be changed at any time. For example, any participant may change his or her own pin state from pinned to unpinned (e.g., from active to inactive) for a given e-mail conversation at any point while the conversation is ongoing. For example, User "A" may compose a new e-mail message to Users "B" and "C", and pin the message for User B (e.g., activate the pin control for User B in the compose widget displayed to User A when composing the message). Upon receiving the pinned message from User A, User B may unpin the message (e.g., deactivate the control pin for the message) so that the message will no longer be displayed to User B in the compose widget. In such a scenario, the compose widget closes for User B and new messages in this conversation will appear in User B's regular inbox. Continuing with the same example, after receiving the pinned message from User A, User B may compose a reply message to Users A and C and pin the reply message to both of the users. In such an instance, the pin state of User C is changed from unpinned to pinned (e.g., by User B changing the state of the control pin for User C from inactive to active in User B's reply message).

In accordance with at least one embodiment, a user may block or prevent any other user from pinning conversations on them. For example, where a first user blocks a second user from being able to pin conversations on the first user, a message composed by the second user may simply appear in the first user's regular e-mail inbox, even if the second user pinned the message for the first user (e.g., activated the control pin for the first user when composing the message). In another example, if the first user blocks the second user from being able to pin conversations on the first user, then there may be a change in the functionality and/or appearance of the control pin for the first user in the compose widget displayed to the second user. For example, when the second user composes a message to the first user, the control pin for the first user may not be selectable by the second user (e.g., the second user may not be able to change the state of the control pin for the first user from inactive to active) or the control pin may appear as unavailable for the first user in the compose widget displayed to the second user. In yet another example, the first user may appear in the compose widget displayed to the second user (e.g., as an intended recipient of the message being composed by the second user) without a corresponding control pin for the first user. In still a further example, a first user may configure his or her mail client to ignore pins from a certain second user (e.g., block this second user). In such a scenario, this information may not necessarily be conveyed to the second user in order to protect the privacy of the communication settings of the first user.

It should also be noted that in situations in which the systems and methods described herein may collect personal information about users, or may make use of personal information, the users may be provided with an opportunity to control whether programs or features associated with the systems and/or methods collect user information (e.g., information about a user's preferences, a current location of a device associated with the user, information about the user's social actions or activities, and the like). Users may also be provided with an opportunity to control whether and/or how to receive content (e.g., notifications, as well as various information contained in or connected with such notifications, such as pin control state data) from servers associated with the systems and methods of the present disclosure. In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a server (e.g., server 115 in e-mail system 120, which will be described in greater detail below with respect to the example system illustrated in FIG. 1).

FIG. 1 illustrates an example system and operating environment in which one or more of the embodiments for selecting and/or changing a display state of an e-mail conversation described herein may be implemented. In accordance with at least one embodiment, an e-mail system 120 may include a client 110 and a server 115, and may be in communication with a plurality of users 105a, 105b, 105c, 105n (where "n" is an arbitrary number) over a network 180 (e.g., the Internet).

FIGS. 5-11 illustrate example user interfaces, some of which may be used in various embodiments of the disclosure to implement one or more features of the example processes described below with respect to the data flow diagrams and flowcharts shown in FIGS. 2-4. Various aspects of the example user interface screens shown in FIGS. 5-11 may be referenced in the descriptions of the processes shown in FIGS. 2-4 for purposes of example and/or illustration. As such, the user interfaces shown in FIGS. 5-11 are at least partially described in the following paragraphs with additional details of each user interface screen being provided in the subsequent descriptions of FIGS. 2-4.

Figure 2:
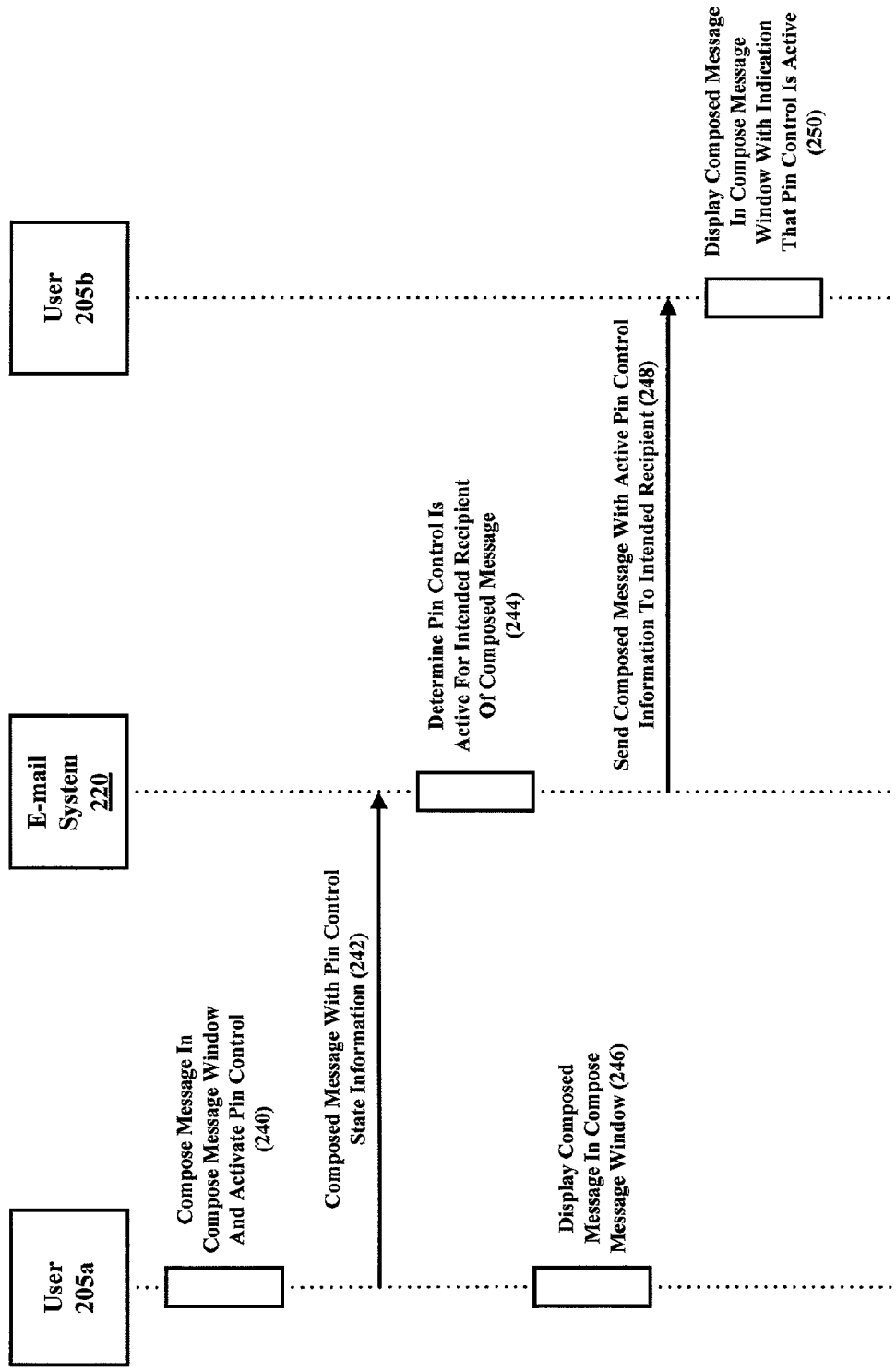
FIG. 2 is a schematic diagram illustrating example data flows between components of a system for selecting and/or changing display state of an e-mail conversation according to one or more embodiments described herein.

FIG. 2 illustrates example data flows between components of a system for selecting and/or changing a display state of an e-mail conversation according to one or more embodiments described herein. In accordance with at least one embodiment, the example components (e.g., user 205a, e-mail system 220, and user 205b) and data flows between the components illustrated in FIG. 2 may be similar to corresponding components and data flows illustrated in FIG. 1 and described above.

In accordance with at least one embodiment, a user 205a (e.g., a "first" user or a "composing" user) may compose a message (e.g., an e-mail message) in a compose message window displayed to the user 205a and activate a pin control for the composed message (240). For example, in response to user 205a requesting to compose a new e-mail message (e.g., by selecting a "compose" button, such as compose button 1060 in the example user interface screen 1020 shown in FIG. 10), a compose message window may be provided for display to user 205a, where the compose message window may be configured to allow the user 205a to compose a new e-mail message and indicate one or more intended recipients (e.g., user 205b or a "second user") of the message. In accordance with at least one embodiment, the compose message window displayed to user 205a may be similar to, for example, compose message window 500 illustrated in FIG. 5. The compose message window displayed to the user 205a may also include a pin control (e.g., message display control 505 in the example compose message window 500 shown in FIG. 5) that the user 205a may activate for the composed message.

Figure 5:
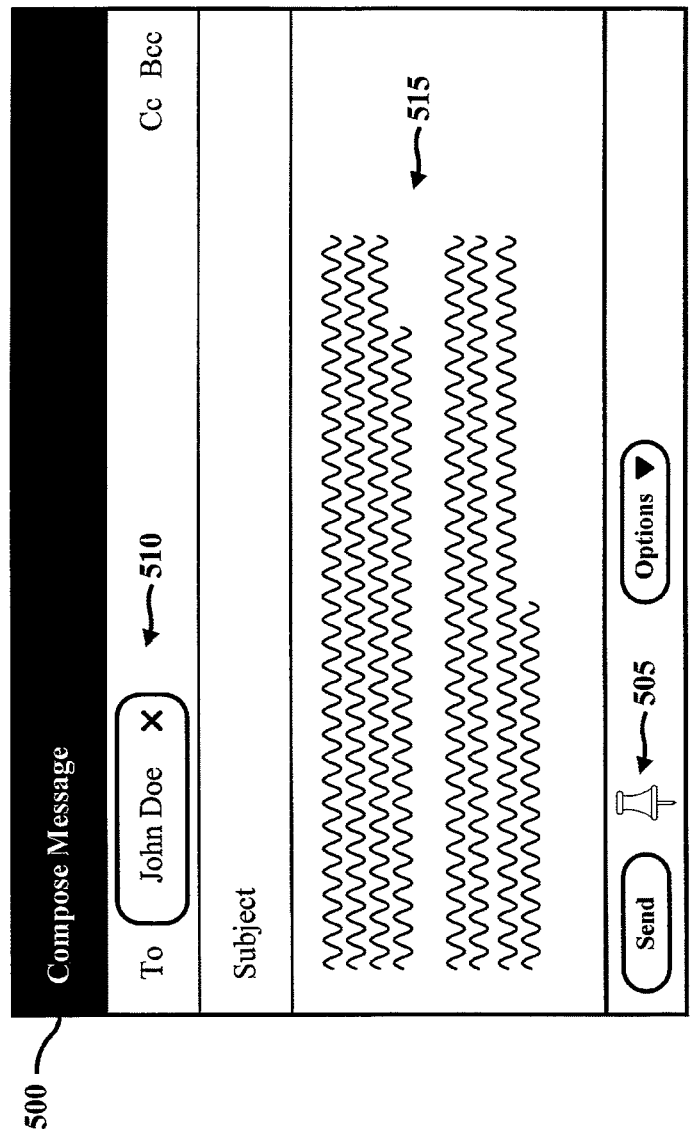
FIG. 5 is an example compose message window that includes a message display control in an inactive state according to one or more embodiments described herein.
Figure 6:
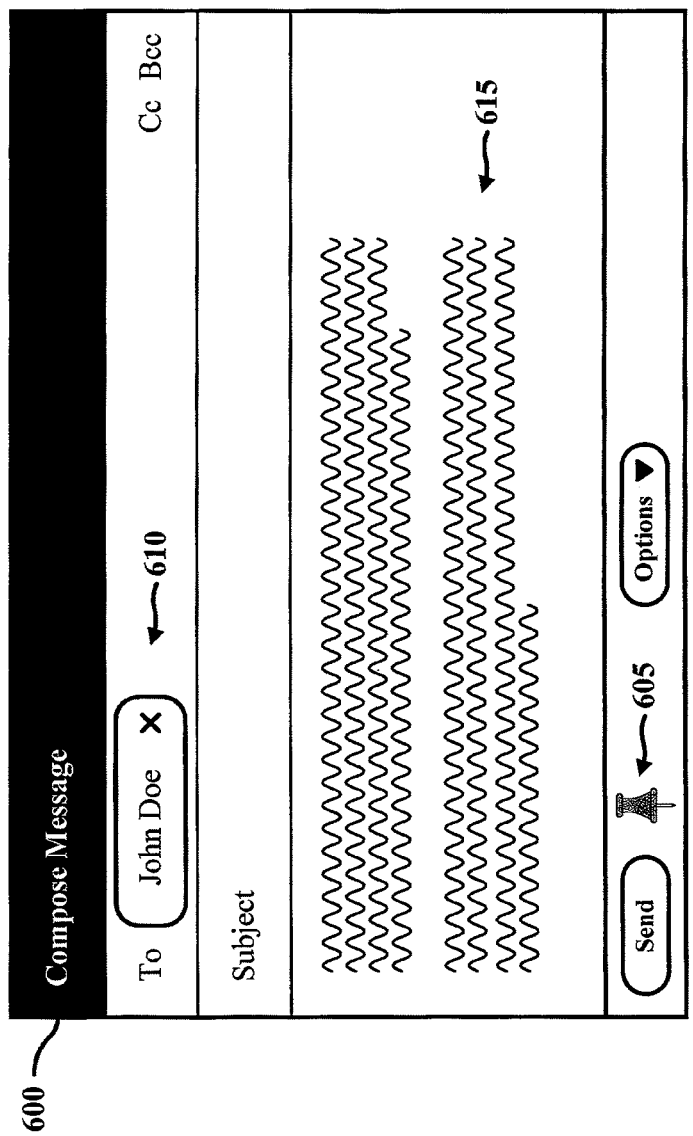
FIG. 6 is an example compose message window that includes a message display control in an active state according to one or more embodiments described herein.

For example, with reference to FIGS. 5 and 6, a user (e.g., user 205a) may be provided with compose message window 500, in which the user can compose a message 515 and indicate an intended recipient 510 for the composed message 515. In accordance with at least one embodiment, the compose message window 500 initially displayed to the user may include a message display control (or active focus indicator) 505 associated with the composed message 515 in an inactive (or deactivated) state. The user, either before, during, or after composing the message may interact with (e.g., select, toggle, etc.) the message display control to change the state of the message display control to active. The example compose message window 600 (shown in FIG. 6) includes a message display control 605 in an active (or activated) state for the composed message 615 to the intended recipient 610.

Referring back to the example data flows illustrated in FIG. 2, the composed message from user 205a, along with pin control state information (e.g., information indicating that the pin control is in an active state) for the composed message, may be sent (242) to an e-mail system 220 (e.g., a server). The e-mail system 220 may determine (244), based on the pin control state information received with the composed message, that the pin control is active for the composed message.

In accordance with at least one embodiment described herein, in response to the user 205a sending a composed message with an active pin control to an intended recipient (e.g., user 205b), the composed message may be displayed (246) to the sending user 205a in the compose message window. Stated differently, when user 205a sends (242) the composed message with active pin control to the intended recipient, the compose message window continues to be displayed to the user 205a, and the message composed by the user 205a is displayed in the compose message window.

The composed message, together with information indicating that the pin control is active for the composed message may be sent (248) from e-mail system 220 to user 205b (a "second" user or a "recipient" user), where the composed message may be displayed to user 205b in a compose message window (250). Where a compose message window for the particular conversation (e.g., e-mail thread, message exchange, etc.) between user 205a and user 205b is already open at user 205b, the composed message may be displayed directly in the open compose message window at user 205b. On the other hand, for example, if the composed message sent to user 205b is the first communication in a new conversation or a new exchange of messages between user 205a and user 205b, then a new (or refreshed) compose message window may be displayed at a forefront of a window being viewed by user 205b, and the message composed by user 205a displayed in the newly presented compose message window.

It should be noted that, in accordance with one or more embodiments described herein, a request to display a compose message window may be made by a user from within an e-mail application installed on a device of the user, or from within a web page present in a browser being utilized by the user. In addition, the information indicating that the pin control is active for a composed message may be sent to the server (e.g., e-mail system 220) while the message is still being composed (e.g., by user 205a). As such, the composed message and the information indicating the state of the pin control may be sent at different times or may be sent separately from one another.

Figure 3:
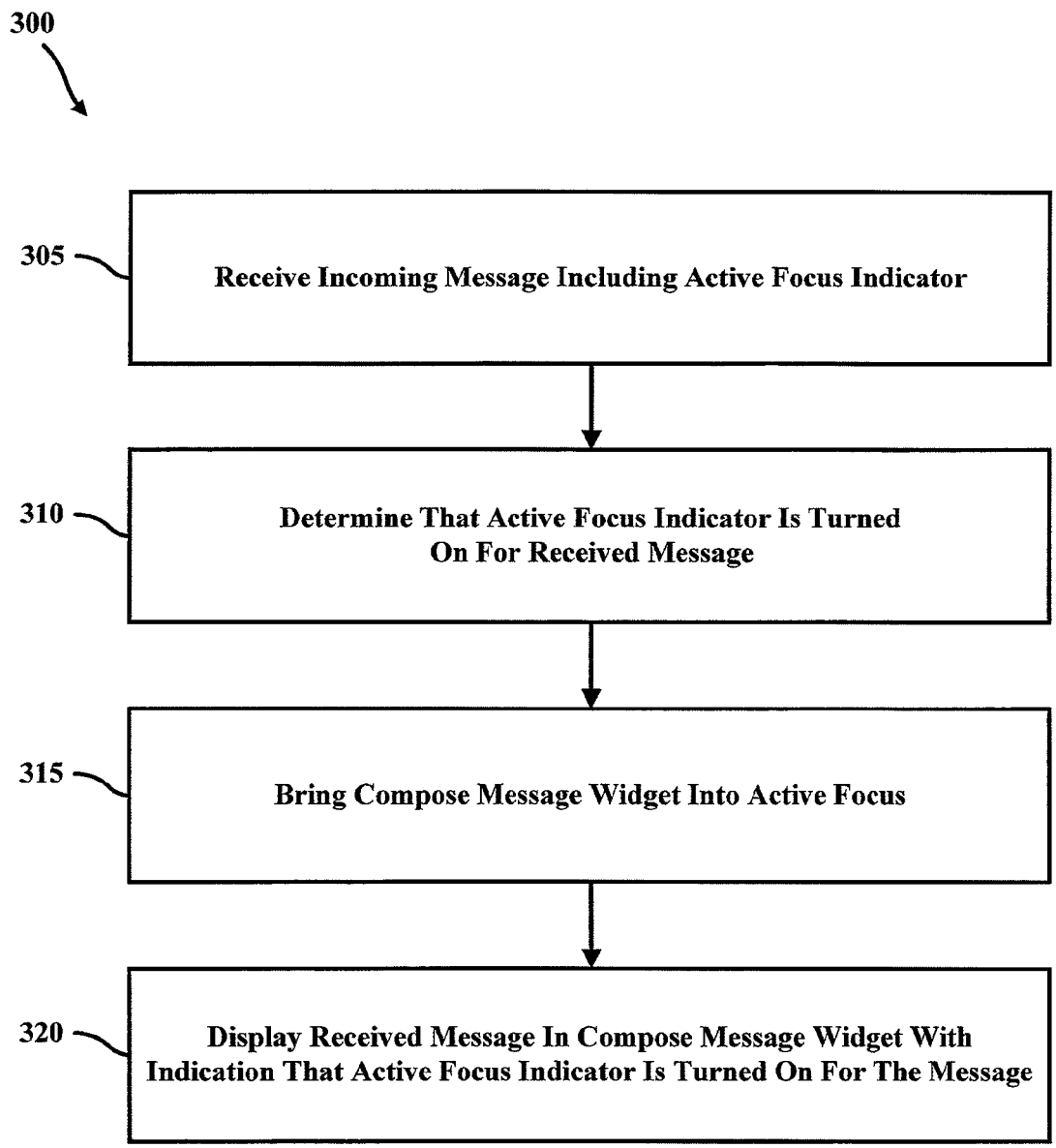
FIG. 3 is a flowchart illustrating an example method for receiving and displaying a message based on a determined display state for the message according to one or more embodiments described herein.

FIG. 3 illustrates an example process for receiving and displaying a message (e.g., e-mail message) based on a determined state of an active focus indicator (e.g., message display control, pin control, etc.) associated with the message. In accordance with one or more embodiments described herein, example process 300 may be performed by an e-mail system configured to allow users to select and/or change a display format or active focus for a composed e-mail message (e.g., e-mail system 120 in the example system shown in FIG. 1).

At block 305, an incoming message (e.g., an e-mail message) may be received. For example, in accordance with at least one embodiment described herein, an incoming message may be received at block 305 at a server operating in connection with an e-mail system being used by a user. In another example, the incoming message may be received (at block 305) from a user from within an e-mail application installed on a device of the user, or from within a web page present in a browser being utilized by the user. The incoming message that may be received at block 305 may include an active focus indicator (e.g., active focus indicator 505 included within message 515 in example compose message widget 500 shown in FIG. 5).

At block 310, a determination may be made that the active focus indicator included in the message received at block 305 is turned on for the received message. For example, it may be determined at block 310 that the active focus indicator associated with the received message is in an active state (e.g., active focus indicator 605 included with message 615 in example compose message widget 600 shown in FIG. 6). In accordance with at least one embodiment, the determination at block 310 that the active focus indicator is turned on for the received message may be based on an analysis of the text of the received message. For example, the determination (at block 310) that the active focus indicator is turned on for the received message may be based on a determination that one or more keywords, phrases, and/or special characters are present within the text of the message. Some non-limiting examples of such keywords or phrases includes "pin", "pinned", "focus", "urgent", "ASAP", "immediate", and the like, while an example of a special character used within message text includes "!". In accordance with at least one other embodiment, the determination that the active focus indicator is turned on for the received message may be based on the presence of one or more keywords/phrases/special characters used in connection with the recipient user's name.

Figure 8:
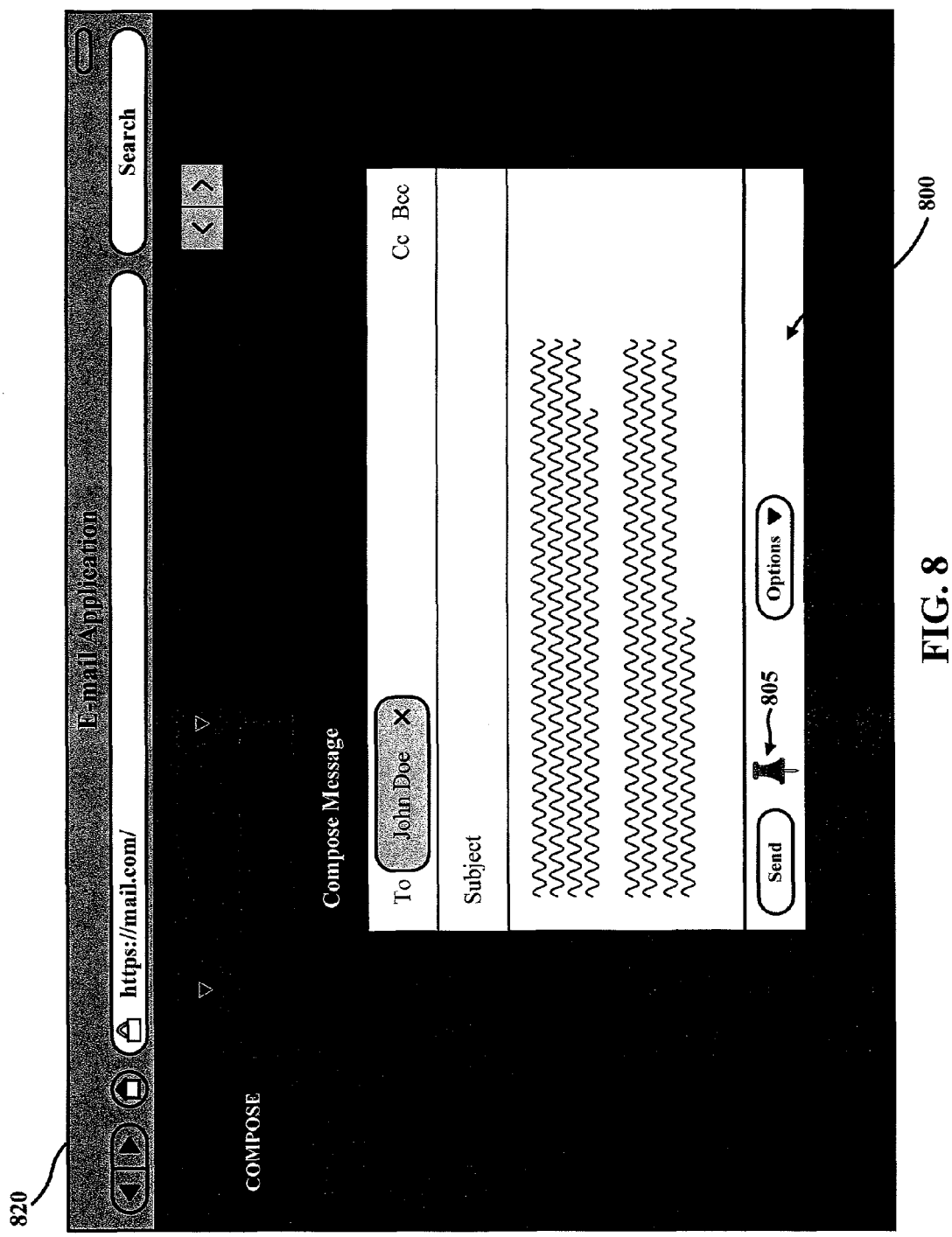
FIG. 8 is an example user interface that includes a compose message window with a message display control in an active state according to one or more embodiments described herein.
Figure 9:
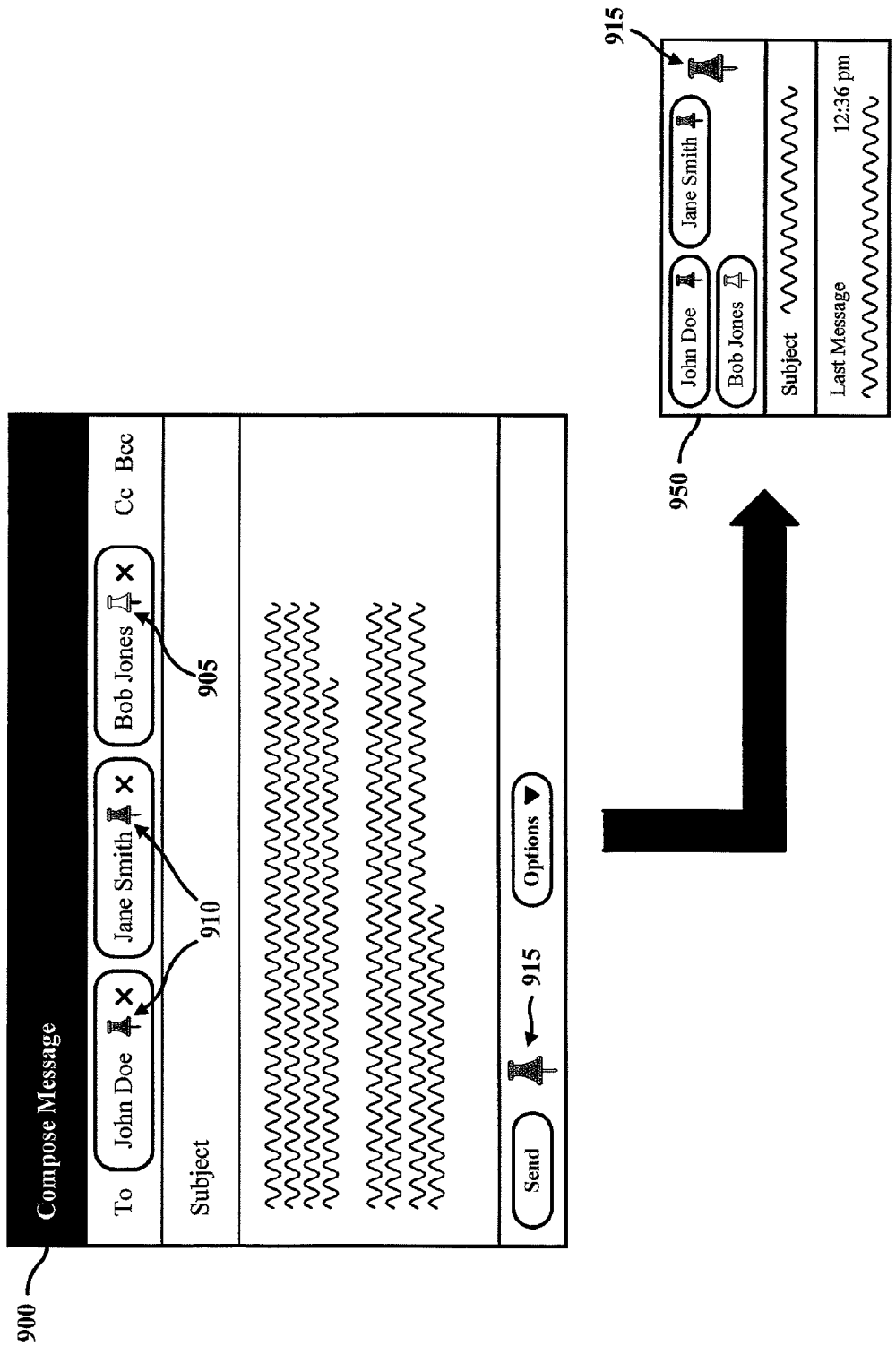
FIG. 9 is an example compose message window in a first view and a second view according to one or more embodiments described herein.

At block 315, a compose message widget may be brought into active focus. For example, in accordance with at least one embodiment, bringing the compose message widget into active focus at block 315 may include displaying the compose message widget in the foreground of a window (e.g., a browser window, a mail application window, etc.) being viewed by the user or a window currently open and active on a display of the user. For example, FIG. 8 shows an example compose message widget 800 displayed in the foreground of a mail application window 820 (e.g., overlaid on a view of the window 820), where the compose message widget includes an active focus indicator 805 that is turned on for the message.

In accordance with one or more other embodiments, bringing the compose message widget into active focus at block 315 may include one or more other actions designed to catch the attention/focus of the user to which the message is directed or to otherwise cause the compose message widget to be noticed or to be more noticeable to the user.

At block 320, the received message (e.g., at block 305) may be displayed in the compose message widget brought into active focus at block 315. In accordance with at least one embodiment described herein, the received message may be displayed at block 320 together with an indication that the active focus indicator is turned on for the message (e.g., active focus indicator 805 in the example compose message widget 800 shown in FIG. 8).

Figure 7:
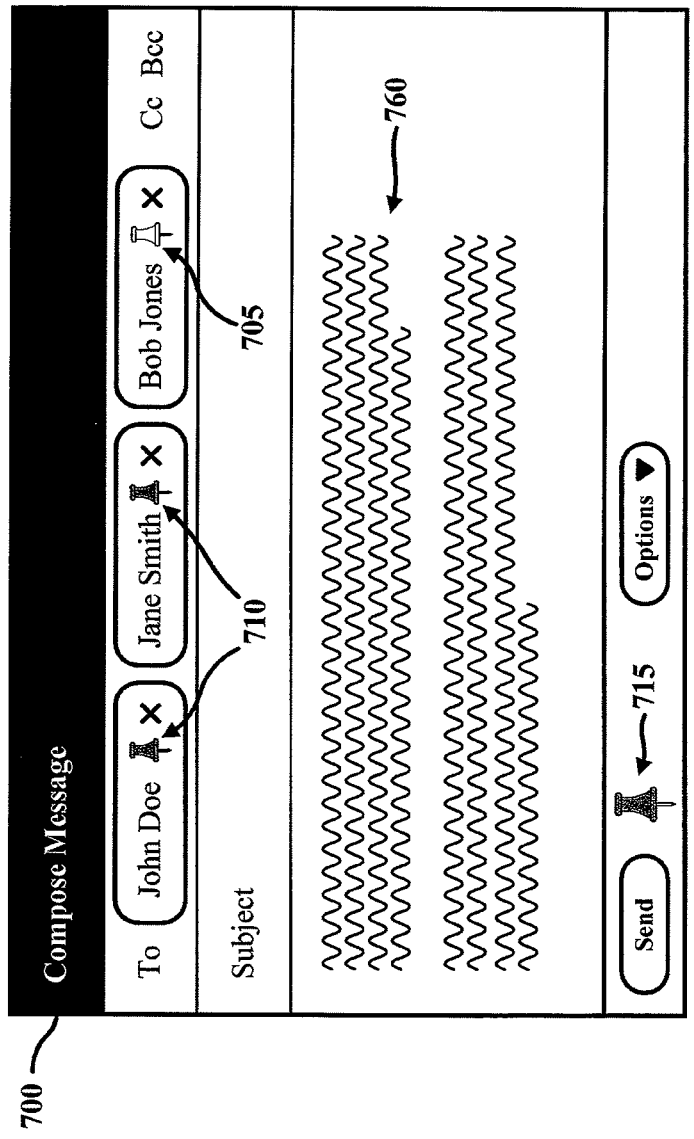
FIG. 7 is an example compose message window that includes message display controls associated with intended recipients of a message according to one or more embodiments described herein.

In accordance with one or more embodiments described herein, rather than an active focus indicator being turned on/off for a given message, active focus indicators associated with each of the intended recipients (e.g., where the message includes multiple intended recipients) may be turned on/off. For example, FIG. 7 shows a compose message widget 700 including a composed message 760 together with an active focus indicator 715 for the overall message, as well as separate active focus indicators 705, 710 for each of the intended recipients of the message. As such, a received message that is displayed in a compose message widget (e.g., at block 320) may include an indication that an active focus indicator 710 associated with a first intended recipient of the message is turned on and an indication that an active focus indicator 705 associated with a second intended recipient of the message is turned off.

In accordance with one or more embodiments of the present disclosure, the example process 300 illustrated in FIG. 3 may include one or more other operations in addition to or instead of the example operations described above. For example, when a recipient user receives a message for which the active focus indicator has been turned on, the received message may be displayed in a compose message widget that is brought into active focus of the recipient user by redirecting a cursor (e.g., mouse pointer) being utilized by the recipient user to the compose message widget. Redirecting an active cursor to the compose message widget in such a manner ensures that the received message is brought into the active focus of the recipient user (e.g., where the recipient user has multiple compose message widgets opened for different ongoing conversations with other users).

Figure 4:
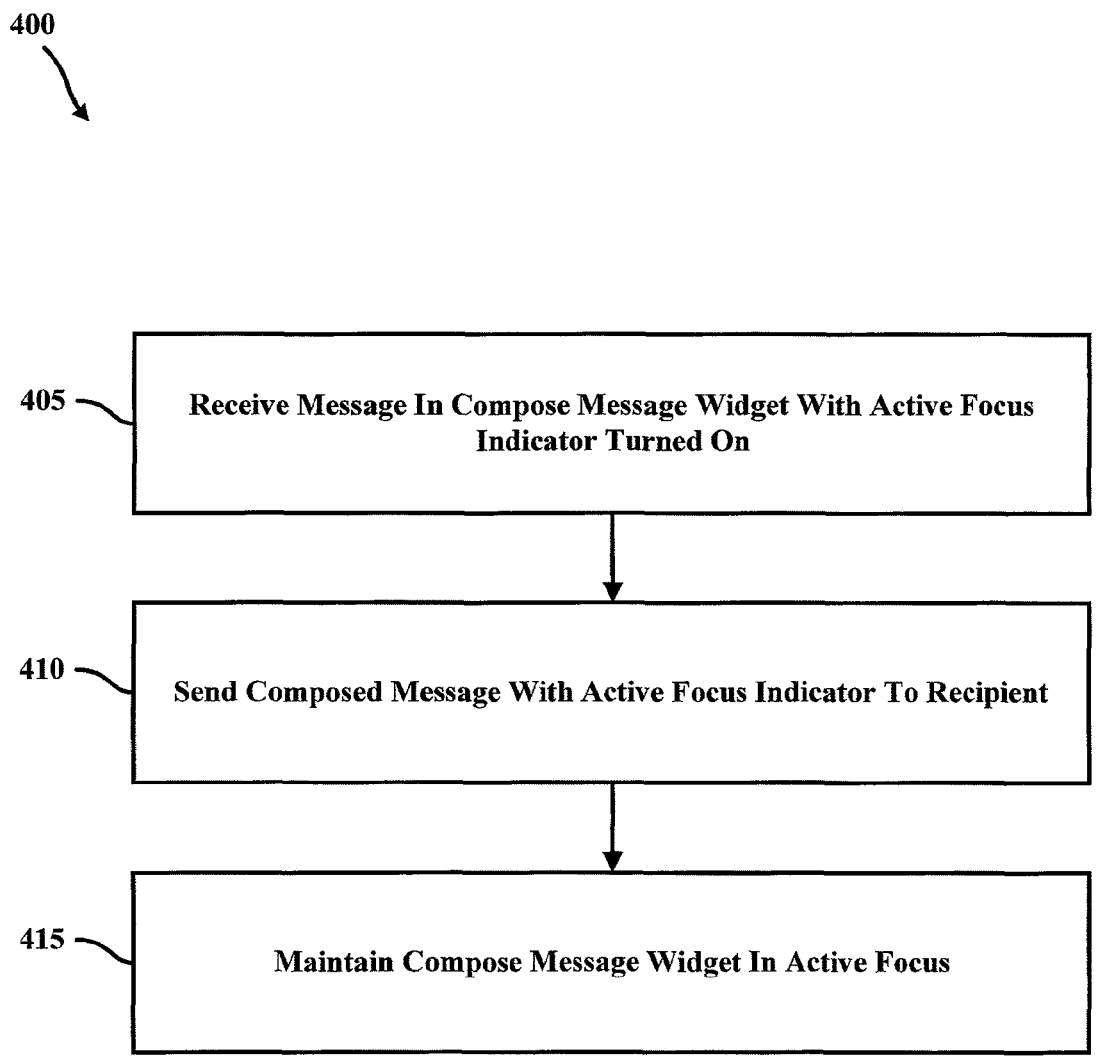
FIG. 4 is a flowchart illustrating an example method for sending a message to recipients with a designated display state for the message according to one or more embodiments described herein.

FIG. 4 illustrates an example process 400 for sending a message (e.g., an e-mail message) to recipients based on determined states of active focus indicators associated with the recipients. In accordance with one or more embodiments described herein, the example process 400 may be performed by an e-mail system configured to allow users to select and/or change a display format for a composed e-mail message (e.g., e-mail system 120 in the example system shown in FIG. 1).

At block 405, a message may be received in a compose message widget, where the received message may include an active focus indicator that is turned on for the message.

At block 410, the composed message received at block 405 may be sent to at least one recipient, where the message may be sent together with an indication that the active focus indicator is turned on for the message.

At block 415, in response to the composed message being sent to at least one recipient at block 410, the compose message widget (in which the composed message may be displayed) may be maintained in an active focus in the foreground of a window. For example, in accordance with at least one embodiment, the compose message widget may be maintained in active focus by continuing to be displayed in a noticeable or attracting manner within a window being viewed or currently opened at the sending user.

As mentioned above, FIGS. 5-11 illustrate example user interface screens including components that may be used in implementing one or more of the various embodiments of the methods and systems described herein. The features and components of the illustrative user interface screens presented in FIGS. 5-11 are described in the context of example e-mail communications between hypothetical users via an online e-mail application. It should be understood that the particular subject-matter of the content contained in any of the example user interface screens shown in FIGS. 5-11, as well as the arrangement of any of the various components comprising these example user interfaces are for illustrative purposes only, and are not in any way intended to limit the scope of the present disclosure. It should also be noted that numerous other variations, types, combinations, and arrangements of user interface screens may also be used to implement certain features of the methods and systems described herein, in addition to or instead of the example user interfaces shown in FIGS. 5-11.

Figure 10:
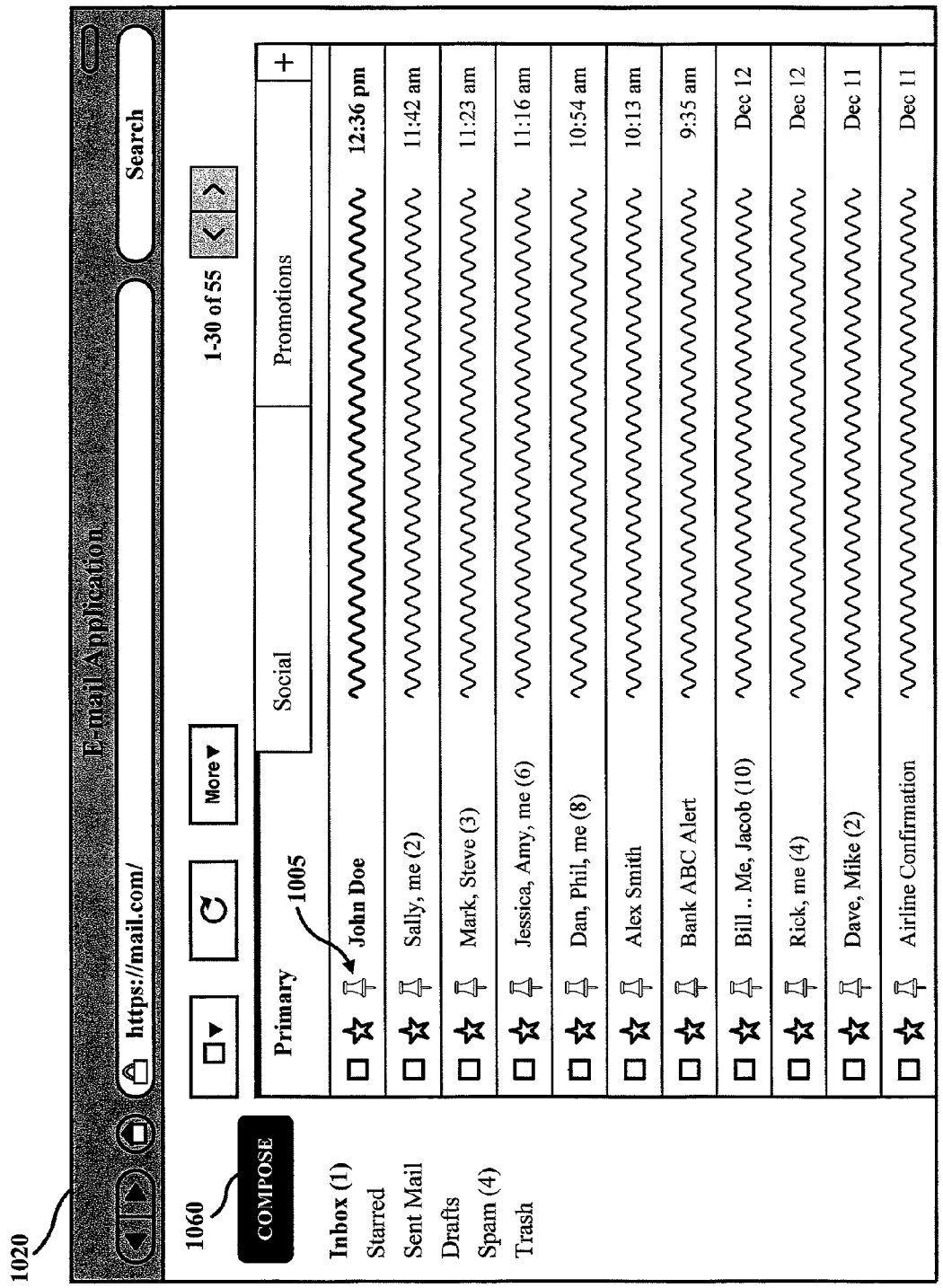
FIG. 10 is an example user interface that includes an inbox of a mail application with message display controls associated with each of the messages contained in the inbox according to one or more embodiments described herein.
Figure 11:
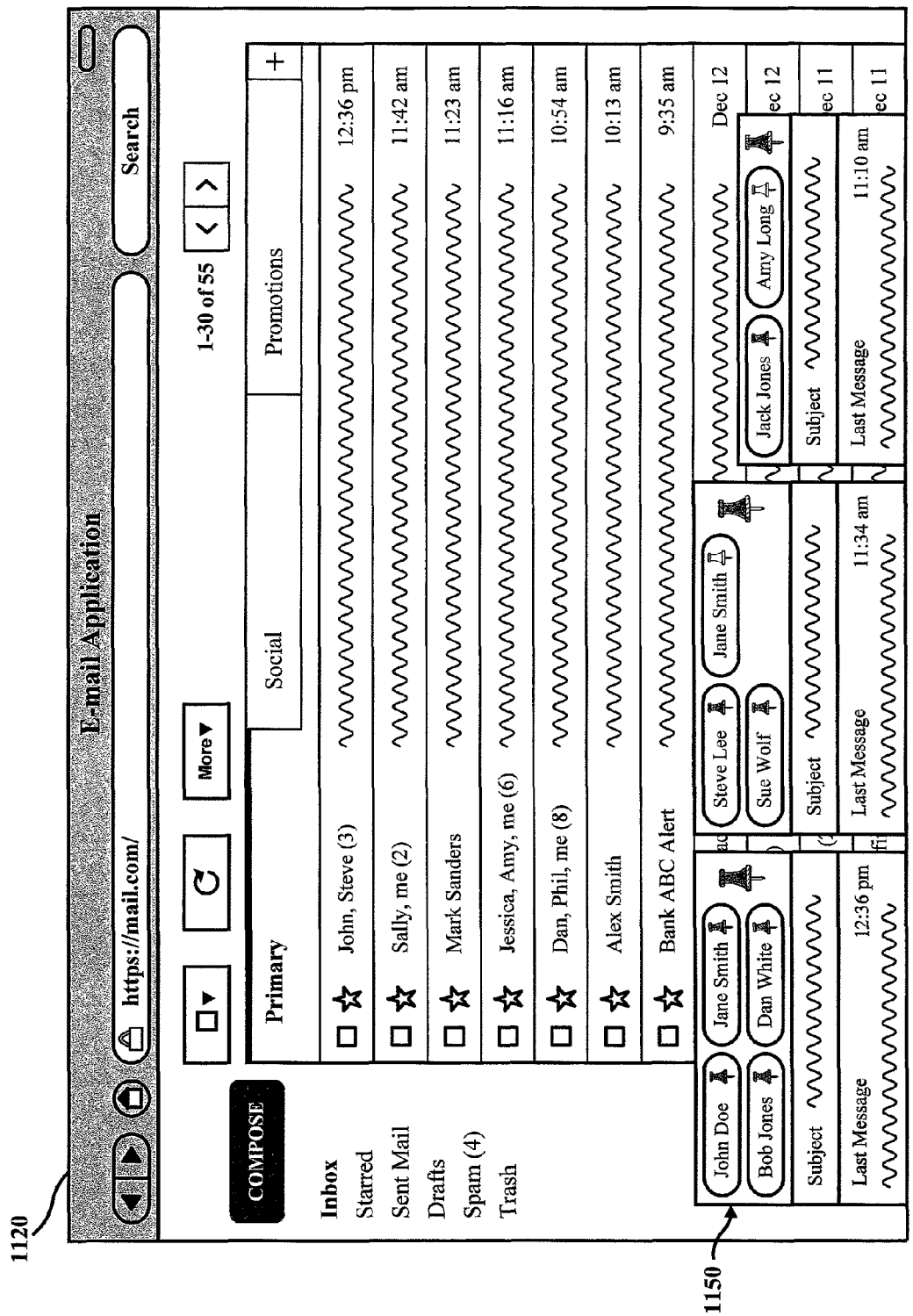
FIG. 11 is an example user interface that includes multiple compose message windows with corresponding message display controls according to one or more embodiments described herein.

The illustrative user interface screens shown in FIGS. 5 and 6 are examples of what may constitute a "compose widget" or "compose message window" in accordance with one or more of the embodiments described herein. Among numerous other features, user interface screens 500 and 600 include a "pin control" or "message display control" 505 and 605 (represented as a push-pin or thumb-tack in FIGS. 5 and 6), respectively. In the example compose widget 500, the pin control 505 is in a deactivated (e.g., deselected, disengaged, disabled, etc.) state, while in the example compose widget 600, the pin control 605 is in an active (e.g., selected, engaged, enabled, etc.) state. Depending on the implementation, the pin control 505/605 may be made available to users (e.g., in the compose message window 500/600, in the users' e-mail inboxes (e.g., as shown in FIG. 10), and/or in some other component or feature of the particular e-mail system being used) in a similar or different shape/form/appearance than the pin control 505/605 shown in the example user interfaces 500 and 600. Further details about various features of the compose message window and the message display control are provided below.

FIG. 7 illustrates an example compose widget (e.g., compose message window) that includes multiple pin controls (e.g., message display controls). In accordance with one or more embodiments described herein, compose widget 700 may be used for an e-mail conversation involving multiple participants, where an outgoing message may be pinned separately for each intended recipient of the message. For example, compose widget 700 identifies three intended recipients of the composed message 760, namely, "John Doe", "Jane Smith", and "Bob Jones". In the example scenario shown, the compose widget 700 includes active pin controls 710 associated with "John Doe" and "Jane Smith" (e.g., the composed message 760 has been "pinned" for each of these recipients), and an inactive pin control 705 associated with "Bob Jones" (e.g., the composed message 760 has not been pinned for this recipient).

In accordance with at least one embodiment, compose widget 700 may also include, in addition to pin controls (705, 710) associated with each of the intended recipients of the composed message 760, a pin control 715 associated with all of the intended recipients of the message (e.g., a "pin all" control). For example, in an e-mail conversation involving a large number of participants, pin control 715 may be activated/deactivated in order to collectively active/deactivate the pin controls (705, 710) associated with the intended recipients, rather than activating/deactivating each of the pin controls (705, 710) associated with the intended recipients on a recipient-by-recipient basis.

Figure 12:
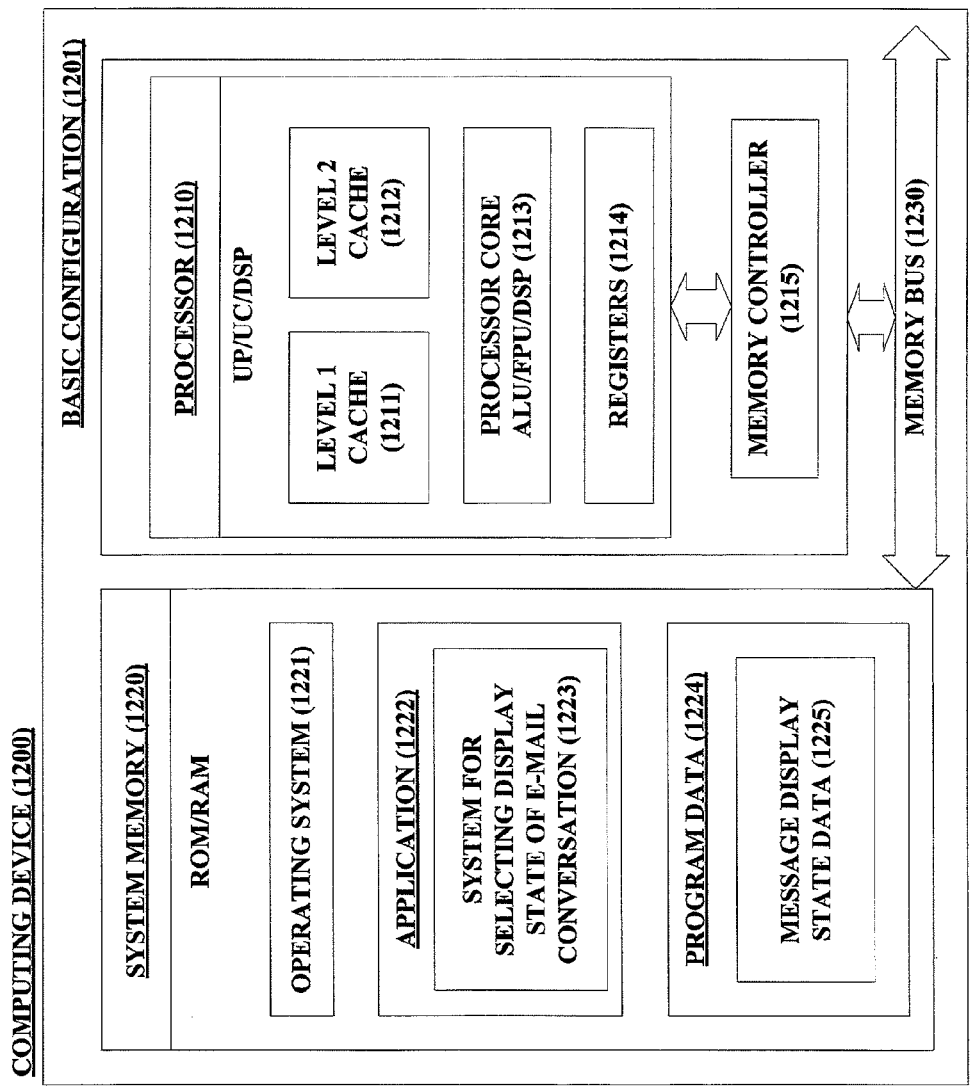
FIG. 12 is a block diagram illustrating an example computing device arranged for selecting and/or changing a display state of an e-mail conversation according to one or more embodiments described herein.

FIG. 12 is a high-level block diagram of an exemplary computer (1200) that is arranged for selecting and/or changing a display state of an e-mail conversation in accordance with one or more embodiments described herein. In a very basic configuration (1201), the computing device (1200) typically includes one or more processors (1210) and system memory (1220). A memory bus (1230) can be used for communicating between the processor (1210) and the system memory (1220).

Depending on the desired configuration, the processor (1210) can be of any type including but not limited to a microprocessor (µP), a microcontroller (µC), a digital signal processor (DSP), or any combination thereof. The processor (1210) can include one more levels of caching, such as a level one cache (1211) and a level two cache (1212), a processor core (1213), and registers (1214). The processor core (1213) can include an arithmetic logic unit (ALU), a floating point unit (FPU), a digital signal processing core (DSP Core), or any combination thereof. A memory controller (1216) can also be used with the processor (1210), or in some implementations the memory controller (1215) can be an internal part of the processor (1210).

Depending on the desired configuration, the system memory (1220) can be of any type including but not limited to volatile memory (such as RAM), non-volatile memory (such as ROM, flash memory, etc.) or any combination thereof. System memory (1220) typically includes an operating system (1221), one or more applications (1222), and program data (1224). The application (1222) may include a system (e.g., system 100 as shown in the example of FIG. 1) for selecting a display state of an e-mail conversation, in accordance with one or more embodiments described herein. Program Data (1224) may include storing instructions that, when executed by the one or more processing devices, implement a system and method for selecting a display state of an e-mail conversation. Additionally, in accordance with at least one embodiment, program data (1224) may include message display state data (1225), which may relate to the state (e.g., active, inactive, etc.) of a message display control (or pin control) for a participant in an e-mail conversation. In some embodiments, the application (1222) can be arranged to operate with program data (1224) on an operating system (1221).

The computing device (1200) can have additional features or functionality, and additional interfaces to facilitate communications between the basic configuration (1201) and any required devices and interfaces.

System memory (1220) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of the device (1200).

The computing device (1200) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1200) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, by one or more processors, a message that includes an active focus indicator indicative of whether the incoming message is to be displayed as a chat message in a compose message widget or an electronic mail message in an electronic mail inbox;
responsive to determining that the active focus indicator is in an active state:
automatically bringing, by the one or more processors, the compose message widget into active focus in a foreground of a window; and
displaying, by a display device, the message in the compose message widget as the chat message with an icon indicating that the active focus indicator is in the active state for the message;
receiving, from a user, an input with respect to the icon, the input indicating that the active focus indicator is to be in an inactive state for the message; and
responsive to receiving the input indicating that the active focus indicator is to be in the inactive state for the message:
automatically closing, by the one or more processors, the compose message widget used to display the message as the chat message; and
displaying the message in the electronic mail inbox with the icon indicating that the active focus indicator is in the inactive state for the message, wherein the electronic mail inbox includes a plurality of messages each having an associated icon indicating a state of a respective active focus indicator, wherein an appearance of each of the icons is different for the active state and the inactive state.

2. The method of claim 1, further comprising redirecting, responsive to determining that the active focus indicator is in the active state, a cursor to the compose message widget.

3. The method of claim 1,
wherein the icon of the first received message comprises a first icon, and
wherein the message displayed in the compose message widget includes the first icon indicating that the active focus indicator is in the active state for a first recipient of the message and a second icon indicating that the active focus indicator is in the inactive state for a second recipient of the message.

4. The method of claim 1,
wherein the message comprises a first message; and
wherein the method further comprises:
receiving a second message including an active focus indicator set to the inactive state;
determining that the active focus indicator for the second message is blocked from being activated for the second message; and
generating a notification of the second message in the electronic mail inbox.

5. The method of claim 1, wherein the determination that the active focus indicator is in the active state for the received message is based on one or more keywords in the text of the received message.

6. The method of claim 1, wherein the incoming message includes a respective active focus indicator for each of the intended recipients of the message, the method further comprising:
determining, for each of the intended recipients of the message, whether the respective active focus indicator is in the active state or the inactive state;
responsive to determining that the respective active focus indicator is in the active state:
bringing the compose message widget into active focus in a foreground of a window being displayed to the intended recipient, and displaying the message in the compose message widget with an indication that the active focus indicator is in the active state; and responsive to determining that the active focus indicator is in the inactive state, displaying the message as the electronic mail message in the electronic mail inbox with an indication that the active focus indicator is in the inactive state for the intended recipient.

7. The method of claim 1, wherein displaying the message comprises displaying, responsive to determining that the active focus indicator is in the active state, the message in the compose message widget without displaying the message in the electronic mail inbox.

8. The method of claim 7, wherein displaying, responsive to determining that the active focus indicator is in the inactive state, the message comprises displaying, responsive to determining that the active focus indicator is in the inactive state, the message in the electronic mail inbox without displaying the message in the compose message widget.

9. The method of claim 1,
wherein the message comprises a first message in an electronic conversation, and
wherein the method further comprises:
receiving a second message in the electronic conversation responsive to the first message, the second message including the active focus indicator set to an inactive state; and
responsive to determining that the active focus indicator of the second message is in the inactive state:
closing the compose message widget; and
displaying the first message and the second message in the electronic mail inbox with an indication that the active focus indicator is in the inactive state for the second message.

10. A system comprising:
one or more processors; and
a non-transitory computer-readable medium coupled to the one or more processors having instructions stored thereon that, when executed by said one or more processors, cause the one or more processors to perform operations comprising:
receiving a message that includes an active focus indicator indicative of whether the incoming message is to be displayed as a chat message in a compose message widget or an electronic mail message in an electronic mail inbox;
responsive to determining that the active focus indicator is in an active state:
automatically bringing the compose message widget into active focus in a foreground of a window; and
displaying the message in the compose message widget as the chat message with an icon indicating that the active focus indicator is in the active state for the message;
receiving, from a user, an input with respect to the icon, the input indicating that the active focus indicator is to be in an inactive state for the message; and
responsive to receiving the input indicating that the active focus indicator is to be in the inactive state for the message:
automatically closing, by the one or more processors, the compose message widget used to display the message as the chat message; and
displaying the message in the electronic mail inbox with the icon indicating that the active focus indicator is in the inactive state for the message, wherein the electronic mail inbox includes a plurality of messages each having an associated icon indicating a state of a respective active focus indicator, wherein an appearance of each of the icons is different for the active state and the inactive state.

11. The system of claim 10, wherein the one or more processors are caused to perform further operations comprising redirecting, responsive to determining that the active focus indicator is in the active state, a cursor to the compose message widget.

12. The system of claim 10,
wherein the icon of the first received message comprises a first icon, and
wherein the message displayed in the compose message widget includes the first icon indicating that the active focus indicator is in the active state for a first recipient of the message and a second icon indicating that the active focus indicator is in the inactive state for a second recipient of the message.

13. The system of claim 10,
wherein the message comprises a first message; and
wherein the one or more processors are caused to perform further operations comprising:
receiving a second message including an active focus indicator set to the inactive state;
determining that the active focus indicator for the second message is blocked from being activated for the second message; and
generating a notification of the second message in the electronic mail inbox.

14. The system of claim 10, wherein the determination that the active focus indicator is in the active state for the received message is based on one or more keywords in the text of the received message.

15. The system of claim 10, wherein the incoming message includes an active focus indicator specific to each of the intended recipients of the message, and the one or more processors are caused to perform further operations comprising:
determining, for each of the intended recipients of the message, whether the active focus indicator is in the active state or the inactive state;
responsive to determining that the respective active focus indicator is in the active state for the intended recipient:
bringing the compose message widget into active focus in a foreground of a window being displayed to the intended recipient, and
displaying the message in the compose message widget with an indication that the active focus indicator is in the active state; and
responsive to determining that the active focus indicator is in the inactive state, displaying the message in the electronic mail inbox with an indication that the active focus indicator is in the inactive state for the intended recipient.

16. A computer-implemented method comprising:
receiving, by one or more processors, a message in a compose message widget;
receiving, by the one or more processors, a first input with respect to an icon representative of an active focus indicator toggling the active focus indicator between an active state and an inactive state, the active focus indicator indicative of whether the message is to be displayed as a chat message in the compose message widget or an electronic mail message in an electronic mail inbox;

sending, by the one or more processors, the message with the active focus indicator to at least one recipient;

maintaining, by the one or more processors and responsive to determining that the active focus indicator is in the active state, the compose message widget in an active focus in the foreground of a window;

receiving, by the one or more processors, a second input with respect to the icon, the second input indicating that the active focus indicator is to be in the inactive state for the message; and responsive to receiving the second input indicating that the active focus indicator is to be in the inactive state for the message:

automatically closing, by the one or more processors, the compose message widget used to display the message as the chat message; and displaying the message in the electronic mail inbox with the icon indicating that the active focus indicator is in the inactive state for the message, wherein the electronic mail inbox includes a plurality of messages each having an associated icon indicating a state of a respective active focus indicator, wherein an appearance of each of the icons is different for the active state and the inactive state.

17. The method of claim 16, wherein an active focus indicator associated with a first intended recipient of the message received in the compose message widget is in the active state and an active focus indicator associated with a second intended recipient of the message received in the compose message widget is in an inactive state, the first recipient being different than the second recipient, and the method further comprising:

sending the message with the respective active focus indicators to the first and second intended recipients.

18. The method of claim 17, further comprising displaying the message in the compose message widget, wherein the displayed message includes the icon, the icon indicating that the active focus indicator associated with the first intended recipient is in the active state.

19. The method of claim 18, wherein the message includes an indication that the active focus indicator associated with the second intended recipient is in the inactive state.

* * * * *